(12) United States Patent
Hellebois et al.

(10) Patent No.: US 12,522,673 B2
(45) Date of Patent: Jan. 13, 2026

(54) METHOD OF EXTRACTION OF A GALACTOMANNAN GUM FROM ALFALFA SEEDS

(71) Applicant: LUXEMBOURG INSTITUTE OF SCIENCE AND TECHNOLOGY (LIST), Esch-sur-Alzette (LU)

(72) Inventors: Thierry Hellebois, Esch-sur-Alzette (LU); Christos Soukoulis, Esch-sur-Alzette (LU)

(73) Assignee: LUXEMBOURG INSTITUTE OF SCIENCE AND TECHNOLOGY (LIST), Esch-sur-Alzette (LU)

( * ) Notice: Subject to any disclaimer, the term of this patent is extended or adjusted under 35 U.S.C. 154(b) by 459 days.

(21) Appl. No.: 18/164,983

(22) PCT Filed: Aug. 3, 2021

(86) PCT No.: PCT/EP2021/071624
§ 371 (c)(1),
(2) Date: Feb. 6, 2023

(87) PCT Pub. No.: WO2022/029103
PCT Pub. Date: Feb. 10, 2022

(65) Prior Publication Data
US 2025/0115683 A1 Apr. 10, 2025

(30) Foreign Application Priority Data
Aug. 5, 2020 (LU) ........................ 101969

(51) Int. Cl.
| C08B 37/00 | (2006.01) |
|---|---|
| A23J 1/00 | (2006.01) |
| A23L 29/206 | (2016.01) |
| A23L 33/21 | (2016.01) |

(52) U.S. Cl.
CPC ........... *C08B 37/0087* (2013.01); *A23J 1/007* (2013.01); *A23L 29/206* (2016.08); *A23L 33/21* (2016.08); *C08B 37/0003* (2013.01)

(58) Field of Classification Search
CPC .................. C08B 37/003; C08B 37/0087
See application file for complete search history.

(56) References Cited

FOREIGN PATENT DOCUMENTS

| CN | 105 837 704 A | 8/2016 |
|---|---|---|
| WO | 1995/021199 A1 | 8/1995 |

OTHER PUBLICATIONS

Zhang, CN 105837704A, 2016, machine translation. (Year: 2016).*
International Search Report issued Nov. 23, 2021 in PCT App. No. PCT/EP2021/071624.
Prajapati Vipul D et al: "Galactomannan: A versatile biodegradable seed polysaccharide", International Journal of Biological Macromolecules, Elsevier BV, NL, vol. 60, May 23, 2013 (May 23, 2013), pp. 83-92, XP028683320, ISSN: 0141-8130, DOI: 10.1016/J.IJBIOMAC.2013.05.017.
Munn D ; et al: "Crystallography of highly substituted galactomannans: Fenugreek and lucerne gums", Macromolecules Nation Eds.; Reidel: Dordrecht Macromol. Rev. Macromolecules, Jan. 1, 1989 (Jan. 1, 1989), Jan. 1, 1989 (Jan. 1, 1989), pp. 2641-2644, XP055797888, Retrieved from the Internet: URL:https://pubs.acs.org/doi/pdf/10.1021/ma00196a017?casa token=Wga06SuBFP8AAAAA:jz1-jRL4uqUIT8SipKvDIHZBOxskKkdO5e6TMJd6p8WYMpakCovS9PNxmin50dF6AmoQ9KMb310 [retrieved on Apr. 21, 2021].
Wang: "Composition of alfalfa leaf protein isolates", Journal of Food Science, Jan. 1, 1975 (Jan. 1, 1975), XP055018970, DOI: 10.1111/j.1365-2621.1975.tb01041.x.
Hadidi Milad et al: "Application of Ultrasound-Ultrafiltration-Assisted alkaline isoelectric precipitation (UUAAIP) technique for producing alfalfa protein isolate for human consumption: Optimization, comparison, physicochemical, and functional properties", Food Research International, Elsevier, Amsterdam, NL, vol. 130, Dec. 17, 2019 (Dec. 17, 2019), XP086080862, ISSN: 0963-9969, DOI: 10.1016/J.FOODRES.2019.108907 [retrieved on Dec. 17, 2019].
Giuberti Gianluca et al: "Exploitation of alfalfa seed (*Medicago sativa*L.) flour into gluten-free rice cookies: Nutritional, antioxidant and quality characteristics", Food Chemistry, Elsevier Ltd, NL, vol. 239, Jul. 3, 2017 (Jul. 3, 2017), pp. 679-687, XP085162621, ISSN: 0308-8146, DOI: 10.1016/J.FOODCHEM.2017.07.004.

* cited by examiner

*Primary Examiner* — Layla D Berry
(74) *Attorney, Agent, or Firm* — Sandberg Phoenix & von Gontard, P.C.

(57) ABSTRACT

A method of extracting polysaccharides from alfalfa plants, the method comprising the followings steps: milling of the alfalfa plants; addition of a buffer solution to the milled alfalfa plants and separation of the milled plants, thus producing a polysaccharides-composed supernatant and a protein-composed pellet; and precipitation of the polysaccharides in the polysaccharides-composed supernatant; the alfalfa plants comprising alfalfa seeds; and the method comprising the following steps, prior to the milling step: soaking of the alfalfa plants in water so as to swell the alfalfa seeds; mesh filtration of the alfalfa plants comprising the swollen alfalfa seeds; and drying of the alfalfa plants comprising the swollen alfalfa seeds.

15 Claims, 6 Drawing Sheets

METHOD OF EXTRACTION OF A GALACTOMANNAN GUM FROM ALFALFA SEEDS

The present invention is the US national stage under 35 U.S.C. § 371 of International Application No. PCT/EP2021/071624 which was filed on Aug. 3, 2021, and which claims the priority of application LU101969 filed on Aug. 5, 2020 the contents of which (text, drawings and claims) are incorporated here by reference in its entirety.

FIELD

The invention is directed to a method for extracting hydrocolloids from alfalfa seeds, and more particularly for extracting galactomannans. This method also enables the production of protein flours and isolates.

BACKGROUND

Alfalfa (*Medicago sativa* L.) is a perennial herbaceous legume from the Fabaceae family, used as a major forage crop around the world. It is easy to cultivate, at low cost and is easily available world-widely, since it does not need any specific growth conditions. Indeed, alfalfa has an excellent adaptability to extreme climate conditions.

Galactomannans are well-known heterogeneous polysaccharides, which can be found in plants, more particularly in Gramineae plants and legume (Fabaceae) plants. They are composed of a β-(1→4)-linked D-mannopyranose backbone branched with α-(1→6)-linked D-galactose grafts. The ratio mannose to galactose depends on their botanical origin. Those galactomannans have several interesting effects, and can be used, for example, as a thickening agent or as a texturing agent in food industry. Those effects vary according to the ratio mannose to galactose.

Galactomannan gums are currently mostly produced for industry from carob gum (Carob tree, *Ceratonia siliqua* L.), guar gum (guar beans, *Cyamopsis tetragonoloba* (L.) Taub.), tara gum (*Caesalpinia spinosa* (Molina) Kuntze), fenugreek gum (*Trigonella foenum-graecum* L.) and cassia gum (*Cassia tora* L.). Those plants need specific climate and soil conditions to grow, thus they can be costly to produce. Furthermore, some of the galactomannan gums, derived from those plants, can comprise other components, such as saponins or polyphenolic compounds, which may impact the quality and purity of the gum obtained.

Thus, it is generally sought and desired to obtain galactomannan gums of good quality for food and cosmetic industry at low cost, i.e. from plants that are easy to grow.

Prior art patent document published CN 105837704 B discloses a method for extracting and purifying alfalfa polysaccharides from the whole plant. Budding alfalfa are mixed and filtered, to obtain a crude alfalfa polysaccharide solution. The solution is then deproteinized before being precipitated in ethanol, and centrifugated for the obtention of an alfalfa polysaccharide solution. The solution does not contain any proteins, peptides or amino groups, but comprises a variety of polysaccharides other than galactomannans. Also, this method uses hard solvents.

Prior art patent document published WO 01/74371 A1 refers to mucilages and galactomannans derived from fenugreek plants, which can be used in particular as thickening agents and as stabilizing agents. Fenugreek seeds are milled and then separated, so as to produce at least a non-lipidic mucilaginous extract. This extract will then be used for a second separation using acetic acid, said separation producing at least a supernatant which is collected. The galactomannans, present in the supernatant, are then precipitated using absolute ethanol. The final product obtained in this prior art comprises at most 5% of proteins. But the fenugreek seeds are difficult to grow with a good yield, and the use of hard solvents for extracting galactomannans is not advantageous for use in the food industry.

Prior art patent document published CN 103304678 B discloses a method for extracting alfalfa polysaccharides from whole plants by using enzymes. Alfalfa plants are crushed into powder, defatted using petroleum ether or ethyl ether, then dried. Enzymes and a buffer solution are added to the defatted powder, which, after filtering, produces a polysaccharide extract. The extract is then concentrated using an ethanol precipitation. But this method uses strong acids and/or alkalis, and uses enzymes which are costly and time consuming.

SUMMARY

The invention has as technical problem to overcome at least one drawback of the above-mentioned prior art. More specifically, the invention has a technical problem to provide a simplified, more effective and/or green-labelled method of producing galactomannans of good quality, in particular for the food and/or cosmetic industry.

The invention is directed to a method of extracting polysaccharides from alfalfa plants, the method comprising the following steps: milling of the alfalfa plants; extraction of polysaccharides by addition of a buffer solution to the milled alfalfa plants and separation of the milled alfalfa plants of the buffer solution, thus producing a polysaccharide-composed supernatant and a protein-composed pellet; and precipitation of the polysaccharides in the polysaccharide-composed supernatant; so as to produce a polysaccharide gum pellet wherein the alfalfa plants comprise alfalfa seeds; and wherein the method comprises the following steps, prior to the milling step: soaking of the alfalfa plants in water so as to swell the alfalfa seeds; mesh filtration of the alfalfa plants comprising the swollen alfalfa seeds; and drying of the alfalfa plants comprising the swollen alfalfa seeds. These steps advantageously allow to concentrate galactomannans in the polysaccharide gum pellet.

The milling step promotes the separation of polysaccharides, proteins, fibres and lipids contained within the seeds. Advantageously, the mesh filtration step is followed by a washing of the seeds with water before the drying step is carried out. This washing step enables the removal of excess pigmentation and of undesirable soluble molecules. The extraction of polysaccharides by addition of a buffer solution means that the polysaccharides are solubilized in the buffer solution, the buffer solution being in various instances an aqueous solution, for example h water. The aqueous solution can be a solution containing at least one salt, or mixture thereof, classically used in the field of the invention. This could be phosphate buffer, of 0.05 M-0.1M, pH 7, Tris buffer etc. The subsequent separation enable the separation between soluble materials (polysaccharides) and insoluble materials (such as proteins, fibres and lipids). Thus, the polysaccharides will be contained within the polysaccharides-composed supernatant, and the proteins, fibres and lipids will be contained within the protein-composed pellet. The soaking step enables the introduction of water within the seeds, thus permitting a better separation of the different layers constituting the seed. The mesh filtration enables the selection of the seeds and the elimination of the wastewater used. The drying step enables the elimination of the excess of water, and improves the yield obtained for the method of extraction.

According to an exemplary embodiment, the step of precipitation of the polysaccharides is made with at least one organic solvent.

The use of organic solvent(s) promotes aggregation and precipitation of polysaccharides. Primary alcohols are the preferred. Ethanol is the most solvent, since it has a lowest affinity to alfalfa gum polysaccharides, and is easily adapted to food applications.

According to an exemplary embodiment, after the step of precipitation of the polysaccharides, several sequential-graded precipitations of the polysaccharides, with at least one organic solvent, are carried out, so as to produce a polysaccharidic gum pellet that is refined. All the steps of precipitation of the polysaccharides are done using at least one organic solvent, the at least one solvent being in various instances "generally recognized as safe" organic solvent (whose acronym is "GRAS", like ethanol, isopropyl alcohol and acetone), or a blend of at least two of these solvents. Some other solvents can be used, like alkanes, for example hexane, DMF, THF, and mixtures thereof provided that they are miscible. The sequential-graded precipitations of the polysaccharides with organic solvent(s) enable a better concentration of polysaccharides, and more particularly, of galactomannans in the final extract. Furthermore, the sequential-graded precipitations enable the removal of impurities, and, in particular of molecules which are undesirable in the final extract. Alternatively, the sequential-graded precipitations can be replaced by alternative methods well-known by the skilled man, such as dialysis.

According to an exemplary embodiment, the several sequential-graded precipitations of the polysaccharides with at least one organic solvent are respectively carried out with sequential concentrations of at the least one organic solvent from 50% to 90% of volume thereof in an aqueous solution, for example water. It is clear to the one skilled in the art that a solution of a solvent, for example ethanol, of 50% in volume means that the solution contains 50% of volume of solvent in the aqueous solution. In such a case, the solvents are water-miscible.

In various instances, the sequential graded precipitations are done, respectively, with ethanol at concentrations of 50%, 70% and 90% in volume in an aqueous solution, for example water, as previously explained.

According to an exemplary embodiment, the alfalfa seeds correspond to at least 90% in weight of the alfalfa plants.

The presence of a higher percentage of alfalfa seeds allows for a higher yield of extraction of galactomannans, since those molecules are mostly present in the endosperm of alfalfa seeds.

According to an exemplary embodiment, the step of extraction further comprises adjusting of the pH of the buffer solution to a pH comprised between 3 and 6.

In various instances, the pH of the milled seeds is adjusted to be comprised between 4 and 5, and for example to be near the isoelectric point of the alfalfa seeds proteins, so as to enable a better separation between the polysaccharides and the proteins. In various instances, the isoelectric point of the alfalfa seeds proteins is of 4.25. These steps enable a sufficient extraction of the soluble polysaccharides.

According to an exemplary embodiment, the soaking of the alfalfa plants in water is carried out at alfalfa plants/water ratios ranging from 1:5 to 1:40, at a temperature comprised between 20° C. and 90° C. for a duration comprised between 20 minutes and 10 hours.

Advantageously, the soaking of the alfalfa plants in water is done at a ratio near 1:10, which facilitates particularly the hydration of the seeds. This ratio is defined in weight. Advantageously, the temperature of soaking of the alfalfa plants is in various instances comprised between 45° C. and 55° C., and for example the temperature of soaking is of about 50° C. The temperature of the soaking step is advantageously selected so as to enable the swelling of the alfalfa seeds, without altering the structure of the polysaccharides and proteins. In various instances, the ratio alfalfa/water is maintained so as to facilitate the hydration of the seeds. In various instances, the duration of the soaking step is between 1.5 h and 2.5 h; and for example the duration is of about 2 hours.

According to an exemplary embodiment, the method further comprises the following steps, after the step of precipitation of the polysaccharides-composed supernatant: centrifugation of the precipitated polysaccharides so as to produce the polysaccharides gum pellet; and reconstitution of the polysaccharide gum pellet in water, forming a dispersed polysaccharide gum pellet, the dispersed polysaccharides gum pellet being adjusted to a pH above 9.

Advantageously, the polysaccharides gum pellet obtained after centrifugation is flashed with nitrogen, so as to evaporate the organic solvent(s) in excess. In various instances, the optimal temperature for adjusting the pH of the dispersed polysaccharides gum pellet is of about 50° C. Those additional steps enable a better separation of the galactomannans contained in the alfalfa seeds.

According to an exemplary embodiment, the method further comprises the following steps, after adjusting the pH of the dispersed polysaccharide gum pellet: acidification of the dispersed polysaccharides gum pellet to a pH comprised between 3 and 6, then centrifugation of the dispersed polysaccharides gum pellet.

Advantageously, for the acidification step, the pH is adjusted to between 4 and 5, and for example to about 4.25, so as to be near the isoelectric point of the alfalfa seeds proteins. The adjustment of the pH near the isoelectric point allows for a better removal of protein impurities.

According to an exemplary embodiment, the method further comprises the following steps, after the step of precipitation of the polysaccharides is carried out: reconstitution in water of the polysaccharides gum pellet; reconstitution of a dispersed polysaccharides gum pellet in an acidified water; neutralization of the dispersed polysaccharides gum pellet with an alkali solute; dialysis, ultrafiltration or reverse osmosis of the dispersed polysaccharides gum pellet; and drying of the dispersed polysaccharides gum pellet.

As previously disclosed, the at least one organic solvent can be "generally recognized as safe" organic solvent (whose acronym is "GRAS", like ethanol, isopropyl alcohol or acetone), or a blend of at least two of these solvents. Acidified water means water comprising an acid at a minimal concentration to achieve a pH corresponding to the Isoelectric point. The dialysis enables the removing of the residual salts, used to neutralize the supernatant. Those additional steps ameliorate the concentration of polysaccharides in the pellet.

According to an exemplary embodiment, the protein-composed pellet, obtained after the step of separation of the milled plants, forms an alfalfa seed meal protein concentrate; the alfalfa seed meal protein concentrate being further processed by the following steps: suspension of the alfalfa seed meal protein concentrate into alkaline water, forming a suspension with a pH above 8; and solid-liquid separation of the suspension, producing a sediment and a supernatant solution, the sediment forming an alfalfa seed protein flour.

Alkaline water means water comprising at least an alkali at a minimal concentration of at least pH=9. In various instances, the suspension has a pH above 9. Advantageously, those steps enable the extraction of the proteins from the alfalfa seed protein flour.

According to an exemplary embodiment, the supernatant solution produced by the solid-liquid separation of the suspension is further processed by the following steps: precipitation of the supernatant solution at a pH comprised between 3 and 6; centrifugation of the supernatant solution, producing at least a precipitate, the precipitate being submitted to a dialysis, an ultrafiltration or a reverse osmosis; and drying of the precipitate, thus forming an alfalfa protein isolate.

Advantageously, the pH for the precipitation of the supernatant solution is comprised between 4 and 5, and for example the pH is selected to be about the isoelectric point of the alfalfa proteins, so of about 4.25.

According to an exemplary embodiment, adjusting the pH above 8 or 9 is carried out with an alkali solute.

In various instances, the alkali solute is selected in the following list: sodium carbonate, potassium carbonate, calcium carbonate, trisodium phosphate, sodium hydroxide, calcium hydroxide, potassium hydroxide, or any combination. For example, the alkali solute can be soda bicarbonate or sodium carbonate, when used for the production of food additives.

According to an exemplary embodiment, adjusting the pH between 3 and 6 is carried out with an acid.

In various instances, the acid is selected in the following list: citric, malic, tartaric, ascorbic, lactic, phosphoric, acetic, fumaric, hydrochloric, sulfuric, nitric acid, or any combination. The acid is in various instances selected to be compatible for the food industry. Thus, the acid in various instances selected is citric acid.

According to an exemplary embodiment, a concentration in weight of galactose and mannose in the polysaccharides gum pellets is at least 80%. In some embodiments, the molar ratio mannose to galactose can in various instances be of from 1:1 to 1:5, for example of from 1.04 to 1.32, for example of from 1.1 to 1.3. The ratio could also be expressed as a weight ratio since mannose and galactose have the same molecular weights.

The invention is also directed to the use of a galactomannan gum pellet obtained by the process according to the invention, as a thickening agent, a gelling agent, a cryo-gelling agent and/or a stabilizing agent wherein the molar ratio mannose to galactose is of from 1:1 to 1:5, in various instances of from 1.04 to 1.32, for example of from 1.1 to 1,3 for example of from 1.04 to 1.32, for example of from 1.1 to 1.3. The ratio could also be expressed as a weight ratio since mannose and galactose have the same molecular weights.

In some alternate embodiments, the invention relates to the use of a galactomannan gum pellet obtained by the process according to the invention as a cryo-gelling agent. Likewise, the molar ratio mannose to galactose can in various instances be of from 1:1 to 1:5, for example of from 1.04 to 1.32, for example of from 1.1 to 1.3. The ratio could also be expressed as a weight ratio since mannose and galactose have the same molecular weights.

In various instances, for using the alfalfa galactomannan gum pellet according to the invention as a thickening agent, the concentration shall be lower than 0.2% of the whole product. It can be used in a number of food products, such as ice creams or fruit preparations, or for cosmetics and personal care products (such as shampoos). As a gelling agent, the alfalfa galactomannan gum pellet can be used at a concentration above 3% w/w. It can be used in food preparations (fruit preparations, such as jellies or jams), cosmetics and personal care products (more particularly for products based on hydrogel technology). As a cryo-gelling agent, the alfalfa galactomannan gum pellet can be used in food preparations, to enable a better cryo-structuration and cryo-stabilization of frozen foods. It is valuable in ice creams products and fruit juice concentrates. As a stabilizing agent, it can be used in food products (such as dressings or ice creams), in cosmetics or personal care products. Advantageously, an alfalfa galactomannan gum pellet can also be used, in a highly purified state, for research applications, as a biodegradable or edible food packages or as an excipient for drugs.

The invention is also directed to the use of a galactomannan gum pellet obtained by the process according to the invention, as a cryo-gelling agent in synergy with at least a second gum product.

Advantageously, the second gum product can be taken in the following list consisting of fenugreek gum, tara gum, locust bean gum, and *cassia* gum, or mixtures thereof. The use of the alfalfa galactomannan gum pellet in synergy with a second gum can reduce the cost of fabrication of food products and/or cosmetic products.

The invention is also directed to the use of an alfalfa seed protein flour obtained by the process according to the invention, as a natural source of vegetal proteins and dietary fibres.

Advantageously, the alfalfa seed protein flour can be a protein and dietary fibre fortifier, and can be used for example in food products or food supplements. In some more embodiments, the dietary fibres can be advantageously aqueous medium insoluble fibres. The non-soluble fibres are known to be water or aqueous medium insoluble polysaccharides presenting healthy properties to the human being or in some instances to animals. The fibres is some other examples can be lipidic compounds and proteins. The aqueous medium can be drinkable water, pure water, or a solution containing water and some biologically acceptable salts in an appropriate amount or concentration and pH.

The invention is also directed to the use of an alfalfa protein isolate obtained by the process according to the invention, as a protein concentrate for food supplements and/or sport applications, and/or for food applications as a structuring, texturing, foaming and/or emulsifying agent that can have a solubility in an aqueous medium at pH 7 of at least 50% w/w, for example of at least 80% w/w, and especially of from 50% w/w to 100% w/w, or even of from 80% w/w to 100% w/w. The aqueous medium is an acceptable for biologically and food uses, and can be water or a solution with acceptable salts, as previously recited. In various instances, the use of an alfalfa protein isolate obtained by the process according to the invention can be for food applications as structuring and/or texturing agents.

The invention is directed to a clean label galactomannan gum fraction from alfalfa plants, comprising: at least 98% or 99% of the total amount of carbohydrates as galactose and mannose monomers; and less than 1% of proteins; the galactomannan gum fraction being obtainable from the galactomannan gum pellet by the process according to the invention, wherein the galactomannan gum fraction is characterized by a zero-shear viscosity ($\eta_0$) of at least 1000 mPa·s$^{-1}$ and an intrinsic viscosity ([$\eta$]) of at least 7 dL·g at 1% w/w in deionized water, at pH=7.

Carbohydrates refers to molecules comprising carbon, oxygen and hydrogen atoms, forming sugars, such as mannose or galactose, and found including in plants. Monomers means molecules which can undergo a polymerization, thus forming polymers, and in particular polysaccharides, such as cellulose or galactomannans.

According to an exemplary embodiment, the gum fraction is of a color white to yellow, and can have a molar ratio mannose to galactose from 1:1 to 1.5:1, for example of from 1.04 to 1.32, for example of from 1.1 to 1.3.

According to an exemplary embodiment, the molecular weight of the galactomannan gum fraction is above 50 kDa.

For example, the molecular weight of the galactomannan gum fraction can be above 500 kDa.

In some embodiments, the molecular weight of the galactomannan gum fraction can in various instances be above 1 400 kDa, above 1 500 kDa, or even of from 1 600 kDa to 2 200 KDa.

The zero-shear viscosity ($\eta_0$) is determined for gum dispersions in the concentration range between 0.5 and 2% w/w, using the Cross model well-known by the skilled man. The intrinsic viscosity ($[\eta]$) of the galactomannans was determined based on the polymer weight average molecular weight Mw data obtained from gel permeation size-exclusion chromatography using the Mark-Houwink equation as modified by Doublier et Launay for aqueous galactomannan dispersions, which are well-known for the skilled man (which acronym is "GPC/SEC analysis").

The invention is directed to a clean label alfalfa protein isolate from alfalfa plants, or for example from alfalfa seeds, and being obtainable by the process according to the invention, the isolate comprising at least 80% to 95% of proteins, and being of a light brown color. The percentage is here the weight over dry basis of the protein isolate, or in other words protein dry weight basis.

The invention is directed to a clean label alfalfa seed protein flour from alfalfa plants, comprising alfalfa dietary fibres and at least 40% proteins, obtainable by the process according to the invention, the "%" here meaning the dry weight basis over dry flour.

Advantageously, the method of extraction according to the invention can also be a wet extraction, and by using mechanical means, so as to enable a better extraction of the proteins.

It is to be noted that the Inventors have also managed to produce a galactomannan gum with Fenugreek seeds, using the method according to the invention. This product comprises a good purity level, with lower than 0.8 to 1% w/w proteins. This gum has good thickening properties, a good cryogel forming capacity at 1% w/w total solids.

The invention is particularly interesting in that it provides a simplified, more effective and green-labelled method for extracting galactomannans in alfalfa plants, and more particularly, in alfalfa seeds, for applications in food or cosmetic industry. The alfalfa galactomannan gum can easily be produced at a lower cost. The seeds on which the method is based are originating from a plant (alfalfa) which is commonly found world-wide, easy to cultivate and relatively inexpensive to produce. The method of extraction of galactomannans, and in particular the initial soaking step and the sequential-graded precipitation step increase the concentration of galactomannans in the galactomannan gum obtained. The use of a pH near the pH of the isoelectric point of alfalfa seeds proteins enables a better concentration of the proteins in the pellet, thus ameliorates the separation between proteins and polysaccharides, thus produces a better galactomannan gum. Using solvents which are tolerated in the food industry avoids further processes to remove potentially dangerous solvents of a composition. Also, the bioactive pigmentation compounds, such as polyphenols, saponins or anthocyanins, are removed in the soaking process, thus the gum has a high purity and quality. At last, the side streams, such as the pellet used for producing proteins isolates and flours, and which are produced while fabricating the new galactomannan gum from alfalfa seeds, can be used, which is not always the case when producing galactomannan gums originating from fenugreek or guar.

DETAILED DESCRIPTION

Figure 1:
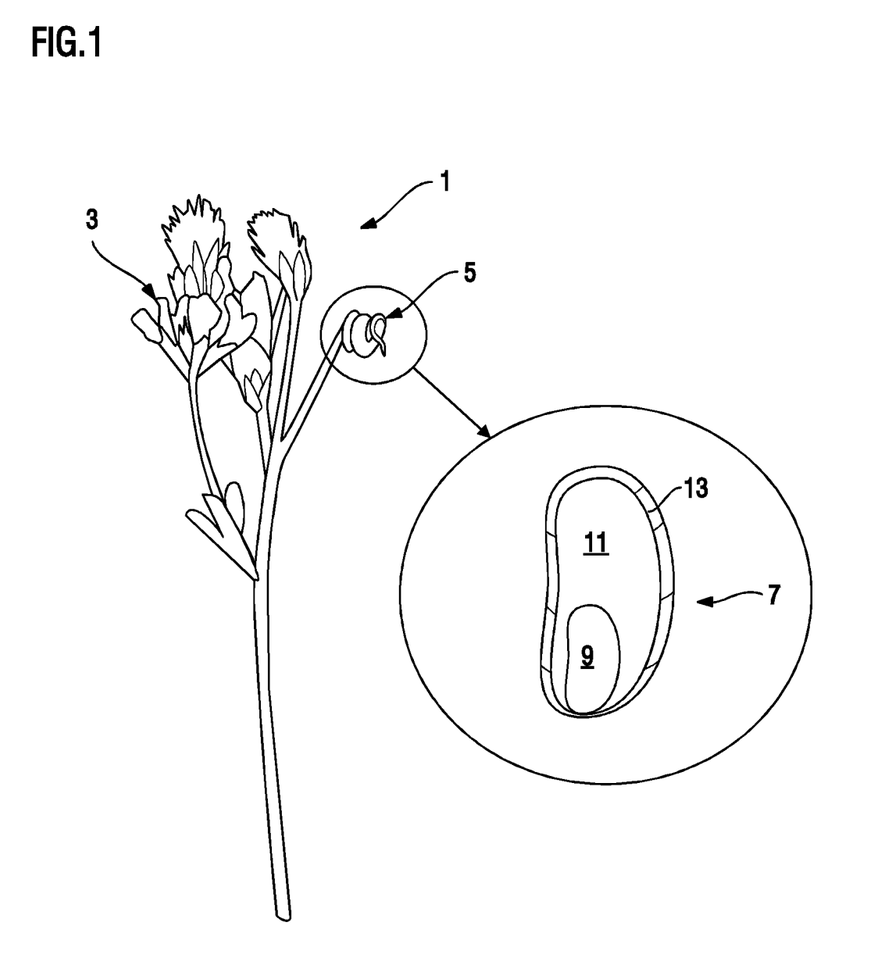
FIG. 1 exemplarily represents an alfalfa plant and seed, in accordance with various embodiments of the invention.

FIG. 1 shows an alfalfa plant and an alfalfa seed. Alfalfa 1 (*Medicago sativa* L.) is a perennial flower plant from the Fabaceae family. Used as a forage crop all around the world, it measures up to 60 cm high and can produce purple flowers 3. Those flowers 3 will produce curved seeds pods 5, each pod 5 comprising generally from 10 to 20 alfalfa seeds 7.

An alfalfa seed 7 comprises an embryo 9, an endosperm 11 composed mostly of galactomannans and a seed coat layer 13 comprising mostly of the insoluble polysaccharides. The endosperm 11 will serve as a reserve in energy to be used for the growth of the embryo 9.

Figure 2:
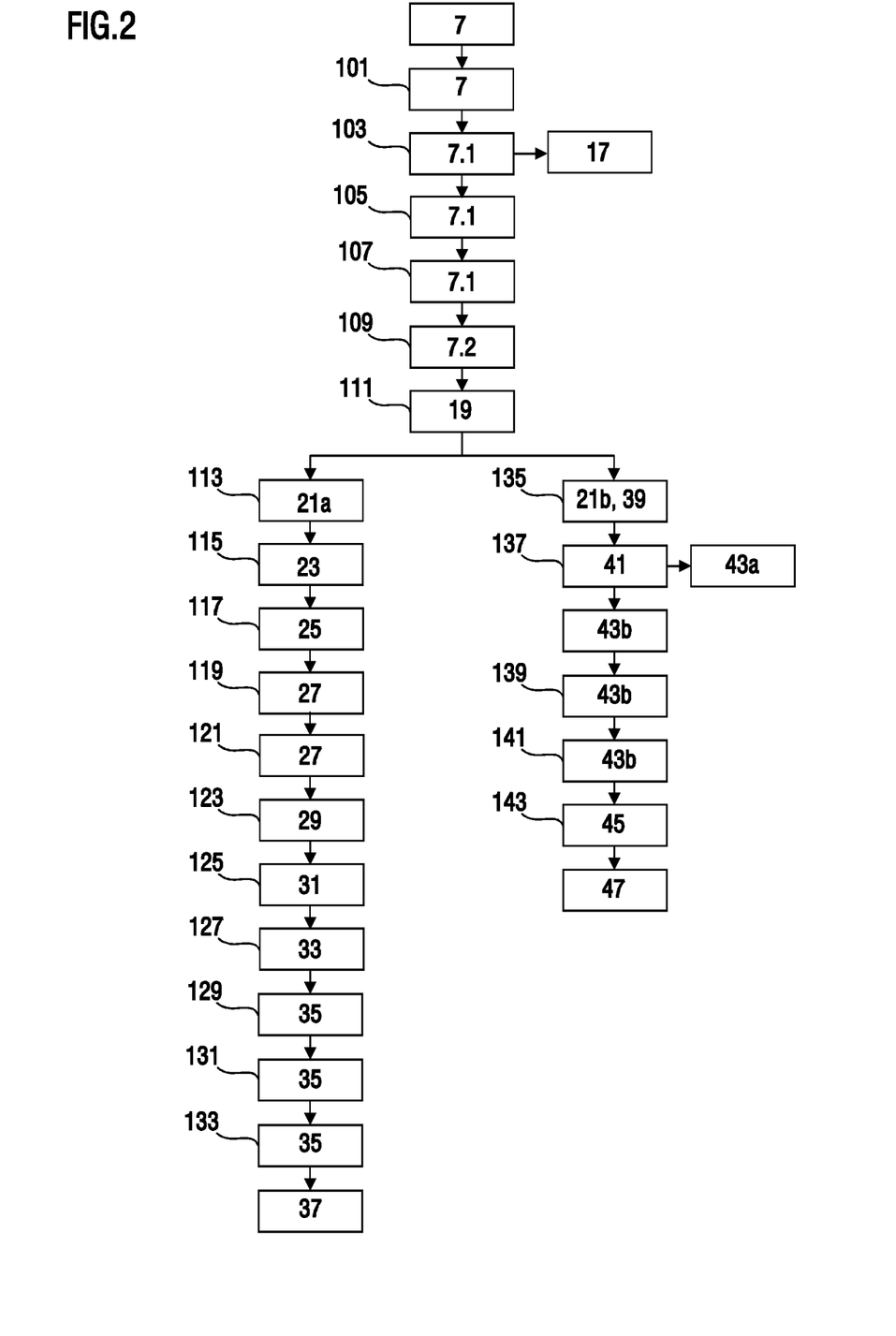
FIG. 2 exemplarily shows the different steps of the method according to various embodiments of the invention.

FIG. 2 shows the different steps of the method of extraction of polysaccharides according to the invention. This method also enables a secondary extraction of other components of the alfalfa seeds 7, such as proteins. The alfalfa plants 1 in the method according to the invention are mostly comprised of alfalfa seeds 7, to a percentage higher than 90% in weight of the alfalfa plants 1. Thus, in the following method, the term alfalfa seeds 7 will be privileged.

The method according to the invention comprises the following steps, shown in FIG. 2, to produce an alfalfa galactomannan gum 37 which is a concentrate of galactomannans in a polysaccharide gum pellet.

A soaking step 101, where the alfalfa seeds 7 are soaked in water at an alfalfa seeds/water ratio, in weight, ranging in various instances from 1:5 to 1:40. The objective of this step 101 is to enable a swelling of the alfalfa seeds 7, in order to help the separation of the different layers constituting the swollen seeds 7.1, thus to ameliorate the separation of its components.

A mesh filtration step 103 of the swollen seeds 7.1. The mesh filtration 103 enables a selection of the swollen seeds 7.1, and eliminates the water used for the soaking step 101.

A drying step 105 of the swollen seeds 7.1. The drying step 105 enables the elimination of the excess in water, and, improves the yield of the method of extraction.

A milling step 107, which enables the production of an alfalfa meal comprising milled seeds 7.2. This step 107 promotes the separation between the proteins, polysaccharides, fibres and lipids.

A step of extraction 109 of a gum extract 19, comprising at least the polysaccharides, is carried out. This step 109 comprises the following sub-steps.

Mixing of the milled seeds 7.2 in water, which enables the extraction of the gum extract 19, and, for the milled seeds 7.2, to be solubilized in water.

Adjusting of the pH of the milled seeds 7.2, to a pH comprised between 3 and 6, this adjustment preventing the protein solubilisation, thus reducing the amount of proteins found in the supernatant after the subsequent centrifugation.

The step of extraction 109 of the gum extract 19 enables a better separation between the polysaccharides and the proteins, and a sufficient extraction of the soluble polysaccharides.

A separation step 111 of the milled seeds 7.2 is carried out. The separation step 111 is a solid-liquid separation, which produces a polysaccharides-composed supernatant 21a and a protein-composed pellet 21b. The polysaccharides-composed supernatant 21a comprises soluble materials, such as polysaccharides, and the protein-composed pellet 21b comprising insoluble materials, such as fibres or proteins.

A precipitation step 113 of the polysaccharides contained in the polysaccharides-composed supernatant 21a. The precipitation step 113 is in various instances done with at least one organic solvent. This step 113 enables the production of a polysaccharides gum pellet 25, the polysaccharides being in various instances precipitated by the organic solvent.

In order to improve the yield of the method of extraction according to the invention, the method can also comprise the following additional steps, shown in FIG. 2.

A step of several sequential-graded precipitations 123 of the polysaccharides can be carried out. This step 123 is generally realized after the precipitation step 113 of the polysaccharides, and uses at least one organic solvent, in various instances with sequential concentrations from 50% to 90%. This step 123 produces a polysaccharides gum pellet 33 that is refined, and enables a higher concentration in polysaccharides, and more particularly, in galactomannans, in the final product. This step 123 also enables a removal of impurities.

A step of dialysis 131, ultrafiltration or reverse osmosis of the polysaccharides gum pellets (25, 33) can be carried out. This step 131 can occur whether or not the step of sequential-graded precipitations 123 is done. Also, when the sequential-graded precipitations step 123 is realized, it is not mandatory to carry out the dialysis step 131. This step 131 increases the concentration of polysaccharides in the alfalfa galactomannan gum 37. The polysaccharides gum pellets (25, 33) comprise at least 80%, in weight, of galactose and mannose monomers.

A more detailed method of producing the galactomannan gum 37 according to the invention is also disclosed in FIG. 2, comprising the following steps.

Soaking step 101. The alfalfa seeds 7 are soaked in water, at an alfalfa seeds/water ratio ranging from 1:5 to 1:40 in weight. In various instances, to have an optimal hydration of the seeds 7, the ratio alfalfa seeds/water shall be of about 1:10. The temperature for soaking the seeds 7 is advantageously comprised between 20° C. and 90° C., in various instances between 45° C. and 55° C., and for example of about 50° C. The temperature can be as high as 90° C. to improve the yield of extraction of the galactomannans. If a better yield of proteins is required, the temperature should not be higher than 70° C., to limit the destruction of proteins and the loss of functionalities. The duration of the soaking step 101 is comprised between 20 minutes and 10 hours, in various instances between 1 h30 and 2 h30. For example, the soaking step 101 shall be of about 2 hours. This step 101 enables the production of swollen seeds 7.1.

Mesh filtration 103 of the swollen seeds 7.1. The swollen seeds 7.1, after filtration, are washed with water. This washing produces, on one side, the swollen seeds 7.1 and on another side, a wastewater 17, composed of undesirable soluble molecules and an excess of pigmentation of the alfalfa seeds 7. This wastewater 17 can optionally be used to retrieve pigments and soluble molecules for further use.

Drying 105 of the swollen seeds 7.1. The swollen seeds 7.1 can be dried by techniques well-known by the skilled man. For example, the drying can be done by air, by spray drying or by freeze drying. This step 105 enables the removal of an excess of water.

Milling 107 of the swollen seeds 7.1. The milling step 107 can be done by techniques well-known by the skilled man, such as knife milling, ball milling, roll milling or screw milling. Knife milling is the most favoured method to obtain an alfalfa meal with milled seeds 7.2.

Extraction 109 of a gum extract 19 after the milling step 107. The extraction step 109 can comprise the following sub-steps.

A first sub-step consists in mixing the milled seeds 7.2 in water.

A second sub-step consists in adjusting the pH of the milled seeds 7.2 between 3 and 6. In various instances, the pH is adjusted between 4 and 5, and for example, between 4.25 and 4.5, while the temperature of the mix is maintained between 20° C. and 90° C., in various instances between 45° C. and 55° C., for at least 2 hours.

This step 109 enables a sufficient extraction of the soluble polysaccharides, by enhancing the purity of the gum 37.

Separation 111 of the gum extract 19 obtained previously. The separation 111 is a solid-liquid separation, which can be done by techniques as those well-known by the skilled man. The most preferred separation techniques are centrifugation, filtering or decanting. For example, the separation step 111 is done by centrifugation. This separation step 111 enables the production of the polysaccharides-composed supernatant 21a and the protein-composed pellet 21b, the polysaccharides-composed supernatant 21a comprising soluble materials, such as polysaccharides, and the protein-composed pellet 21b comprising insoluble materials, such as fibres or proteins. After removal of the protein-composed pellet 21b, a dilution of the polysaccharides-composed supernatant 21a in water, at a temperature below 50° C., can be carried out. This lowers the viscosity of the supernatant 21a and enables the removal of more insoluble parts, thus allowing a better purification of the gum 37.

The following steps enable the extraction of galactomannans from the polysaccharides-composed supernatant 21a.

Precipitation 113 of the polysaccharides-composed supernatant 21a with at least one organic solvent. This precipitation step 113 promotes the aggregation and the precipitation of polysaccharides. The polysaccharides form a precipitate in the precipitated supernatant 23. For example, the solvent used in the precipitation step 113 is ethanol, which is easily adapted to food applications.

The precipitated supernatant 23 comprises a high concentration in galactomannans.

Centrifugation 115 of the precipitated supernatant 23. This centrifugation step 115 enables the formation of a polysaccharides gum pellet 25, comprising mostly the precipitate of polysaccharides.

Reconstitution 117 in water of the polysaccharide gum pellet 25. After the reconstitution step 117, a dispersed polysaccharide gum pellet 27 is produced. The pH of the dispersed polysaccharides gum pellet 27 is adjusted above 9, and for example between 9.5 and 10.5. This step 117 helps with the solubilisation of the residual proteins and thus, helps having a better deproteinization of the dispersed polysaccharides gum pellet 25.

Acidification 119 of the dispersed polysaccharide gum pellet 27. The pH of the dispersed polysaccharides gum pellet 27, after the acidification step 119, is comprised between 3 and 6. In various instances, the pH is between 4 and 5, and for example the pH is near 4.25, the isoelectric point of the alfalfa seeds proteins. The acidification step 119 is realized with an acid. This step 119 enables a removal of proteins impurities.

Centrifugation 121 of the dispersed polysaccharides gum pellet 27. A supernatant 29, obtained after the centrifugation step 121, is collected. The supernatant 29 is neutralized to a pH=7. In various instances, the neutralization of the supernatant 29 is realized with an alkali solute, which is for example sodium carbonate.

The steps 115 to 121 enable a better separation of galactomannans contained in alfalfa seeds 7, and to allow a better removal of impurities.

Sequential-graded precipitations 123 with at least one organic solvent. In various instances, the organic solvent used is ethanol, the supernatant 29 being then precipitated sequentially using ethanolic solutions at different concentrations. In various instances, the concentration of ethanol is between 50% and 90% in volume. For example, the sequential precipitation 123 is done three times, the first time with a concentration in ethanol of about 50%, the second time with a concentration in ethanol of about 70%, and the third time with a concentration in ethanol of about 90%. The sequential-graded precipitations step 123 serves to eliminate the residual salts, and for example, the sodium citrate, of the supernatant 29, and also serves to boost the purification of the galactomannans. A suspension 31 is obtained after the sequential-graded precipitation step 123 is carried out.

Centrifugation 125 of the suspension 31. The centrifugation step 125 enables the obtention of a polysaccharides gum pellet 33 that is refined, the pellet 33 comprising the precipitate of galactomannans contained within the suspension 31.

Reconstitution 127 of the polysaccharides gum pellet 33 that is refined in water. This reconstitution step 127 enables the production of a dispersed polysaccharides gum pellet 35 that is refined, which can be, thereafter, reconstituted into acidified water. This step 127 allows a good dialysis by enabling the polysaccharides gum pellet 33 to be solubilized.

Neutralization 129 of the dispersed polysaccharides gum pellet 35 that is refined. In various instances, the pH of the pellet 35 is neutralized with an alkali solute, such as sodium carbonate, so as to obtain a pH of 7.

Dialysis 131 of the dispersed polysaccharide gum pellet 35 that is refined. The dialysis step 131 enables a separation between molecules of high molecular weight, such as galactomannans, and molecules with a low molecular weight (lower than 12.4 kDa, such as monosaccharides and polysaccharides of short chains). Dialysis is the most preferred method of separation, but an ultrafiltration or a reverse osmosis can also be used. Also, the dialysis enables a better removal of the salts used in the pH-adjustment steps, and a better concentration of galactomannans in the galactomannan gum 37.

Drying 133 of the dispersed polysaccharide gum pellet 35 that is refined. The drying step 133 enables the production of the galactomannan gum 37, where at least 98% or 99% of the total amount of carbohydrates are galactose and mannose monomers. In various instances, the drying is done by methods well-known by the skilled man, such as spray drying or freeze drying. This step 133 enables the elimination of the unneeded water.

The galactomannan gum 37 obtained by this method is "clean label", meaning that the gum 37 does not need, for its fabrication, complex methods using strong alkalis and/or acids, which could be harmful for the environment. Those types of solvents would need further processing steps to be removed from the gum, which can be time and cost consuming.

The galactomannan gum 37 is also in various instances produced from alfalfa seeds 7, and comprises at least 98% or 99% of its carbohydrates as galactose and mannose monomers, and less than 1% of proteins. The total carbohydrate content is determined using an enzymatic assay kit, a well-known method for the skilled man. The measurement of the percentage of proteins is done by using the method of Dumas using an analyser CHNS/O.

The galactomannans contained in the gum 37 have a ratio mannose to galactose from 1:1 to 1.5:1, this ratio being in various instances calculated by the method of ion chromatographic analysis. This ratio depends on the botanical origin of the galactomannan, but it can be modified by chemical or enzymatic manipulations, and more particularly, by using a galactosidase, i.e. an enzyme capable of removing galactose moieties from the mannan backbone. This enzyme can modify the number of galactose residues on the backbone, thus the mannose to galactose ratio and therefore the techno-functionalities of the modified galactomannan gum 37. A low ratio, such as the ratio of alfalfa seeds galactomannans, is easier to modify to develop adequate properties in the modified gum 37.

The galactomannan gum 37 presents a colour white to yellow, and has bland taste and odour, which renders it particularly useful when used for food industries, since it does not need to be further processed or altered to remove unpleasant odour and taste before use. The molecular weight of the galactomannan gum 37 is in various instances above 50 kDa. The gum 37 has a zero-shear viscosity ($\eta_0$) of at least 1000 mPa·s$^{-1}$ at 1% w/w in deionized water, at pH=7 at 25° C. and an intrinsic viscosity ($[\eta]$) of at least 7 dL·g$^{-1}$ at 1% w/w in deionized water at 25° C.

A galactomannan gum 37 produced by the method of the invention can be used as a thickening agent, a gelling agent, a cryo-gelling agent and/or a stabilizing agent. The galactomannan gum 37 can also be used as a cryo-gelling when used in synergy with a second gum product. Those effects will be demonstrated in the FIGS. 3 to 6 and in the examples 1, 3, 4, 5, 7, 10 and 13 as followed.

This method of extraction produces wastes, which can be further processed for retrieving other components of alfalfa seeds, in particular for retrieving alfalfa proteins.

The separation step 111 of the milled seeds 7.2 produces also a protein-composed pellet 21b. This protein-composed pellet 21b is comprised mostly of insoluble materials, such as fibres and at least 40% of proteins. Thus, the pellet 21b forms an alfalfa seed meal protein concentrate 39. In order to ameliorate the concentration in proteins in the final product, the alfalfa seed meal protein concentrate 39 is further processed by the following steps.

Suspension 135 of the alfalfa seed meal protein concentrate 39 into alkaline water, forming a suspension 41. The pH of the suspension 41 is above 8. For example, the pH of the suspension 41 is comprised between 9 and 10. Alkaline water means water comprising at least an alkali with a minimum pH of 9. This allows to solubilize as much proteins as possible so that, after the next step, the proteins will stay in the supernatant and will be separated from the rest of the insoluble.

Implementation of a solid-liquid separation 137 of the suspension 41. Several techniques can be used for this separation, such as centrifugation, filtering and decanting. These techniques enable the production of a sediment 43a, comprising insoluble materials, and a supernatant solution 43b, comprising soluble materials, the sediment 43a forming an alfalfa seed protein flour. This alfalfa seed protein flour comprises at least 40% proteins and, for the most part, dietary fibres. Thus, the flour serves as a natural source of vegetal proteins and dietary fibres.

Precipitation 139 of the supernatant solution 43b. The pH expected for the supernatant solution 43b is comprised between 3 and 6, in various instances between 4 and 5, and for example about 4.25, the isoelectric point of alfalfa seeds proteins. The precipitation step 139 enables an aggregation of proteins in the supernatant solution 43b.

Centrifugation 141 of the supernatant solution 43b. This centrifugation 141 produces at least a precipitate 45, the precipitate 45 being processed by dialysis, ultrafiltration or by reverse osmosis. Alternative liquid-solid separation methods, well-known by the skilled man, can also be used. This step 141 enables the recuperation of the proteins concentrated in the precipitate 45.

Drying 143 of the precipitate 45. The drying step 143 forms an alfalfa protein isolate 47, which can contain at least 80% to 95% of proteins, and be of a light brown colour, with relative bland taste and odour. The lack of taste and odour of the isolate 47 enables an easier means of utilisation, since it does not need to be further processed before being used in food applications. The alfalfa protein isolate 47 obtained by the method according to the invention can be used for food supplements and/or sport nutrition applications, and/or for food applications as a structuring, texturing, foaming and/or emulsifying agent.

In the methods previously disclosed, the adjustment of the pH above 8 or 9 is carried out with an alkali solute in various instances selected in the following list: sodium carbonate, potassium carbonate, calcium carbonate, trisodium phosphate, sodium hydroxide, calcium hydroxide, potassium hydroxide, or any combination. For example, the alkali solute is in various instances soda bicarbonate or sodium carbonate. When used for the production of food additives, it is for example sodium carbonate. Similarly, the adjustment of the pH between 3 and 6 is carried out with an acid. In various instances, the acid is selected in the following list: citric, malic, tartaric, ascorbic, lactic, phosphoric, acetic, fumaric, hydrochloric, sulfuric, nitric acid, or any combination. More specifically, when the final products are to be used in food industries, the acids in various instances chosen are food tolerated, such as citric acid. This will limit the subsequent processing steps to eliminate any non-edible solvents before the final products are to be used in food industries. In various instances, when an organic solvent or several organic solvents are used, those solvents can be "generally recognized as safe" organic solvents (whose acronym is "GRAS", like ethanol, isopropyl alcohol or acetone), or a blend between at least two of these solvents. For example, in food applications, an exemplary organic solvent to use is ethanol.

Figure 3:
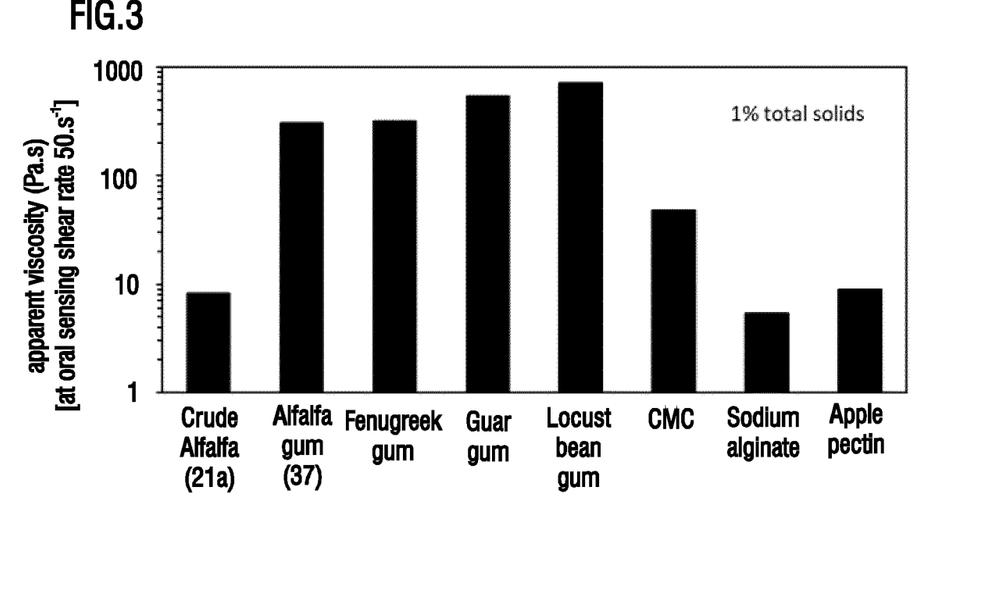
FIG. 3 exemplarily shows the thickening performance of an alfalfa galactomannan gum according to various embodiments the invention, and compared to commercial gums.

FIG. 3 shows the thickening performance of the alfalfa galactomannan gum obtained according to the above procedure, in comparison with several commercial gums.

Fenugreek gum, locust bean gum and guar gum are commercially available thickening agents, composed by galactomannans. Carboxymethyl Cellulose (which acronym is "CMC", as mentioned in the figure) is also a thickening agent. Apple pectin and sodium alginate are also two well-known thickening agents, extracted from plants (respectively, from apple peels and from algae), and used in particular in the food industry.

The alfalfa galactomannan gum 37 (or "alfalfa gum", in the figure), the final product extracted by the method according to the invention, has a similar viscosity as the galactomannan gum extracted from guar, fenugreek and locust bean gum. It has also a better viscosity than CMC, apple pectin and sodium alginate. The crude alfalfa product 21a (corresponding to the polysaccharides-composed supernatant 21a), obtained after the first precipitation step 111, has a lower viscosity, nearer from the sodium alginate and apple pectin products.

Figure 4:
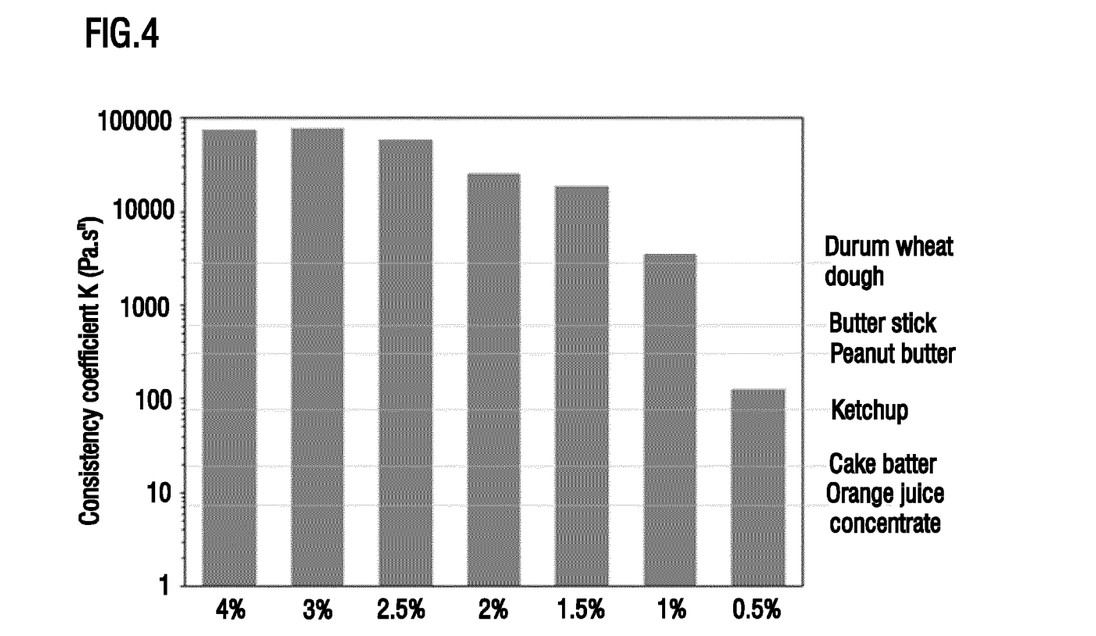
FIG. 4 exemplarily shows the thickening performance of the alfalfa galactomannan gum according to various embodiments of the invention, depending on its concentration, and, in comparison with food products.

In FIG. 4, the thickening effect of the alfalfa galactomannan gum is shown, depending on its concentration, and compared to several commercially available products.

In FIG. 4, the consistency coefficient increases proportionally to the amount of alfalfa gum 37, in the tested alfalfa gum concentration range of 0.1% to 4%. This gum 37 could be used in different types of products, depending on the consistency needed for the product.

Figure 5:
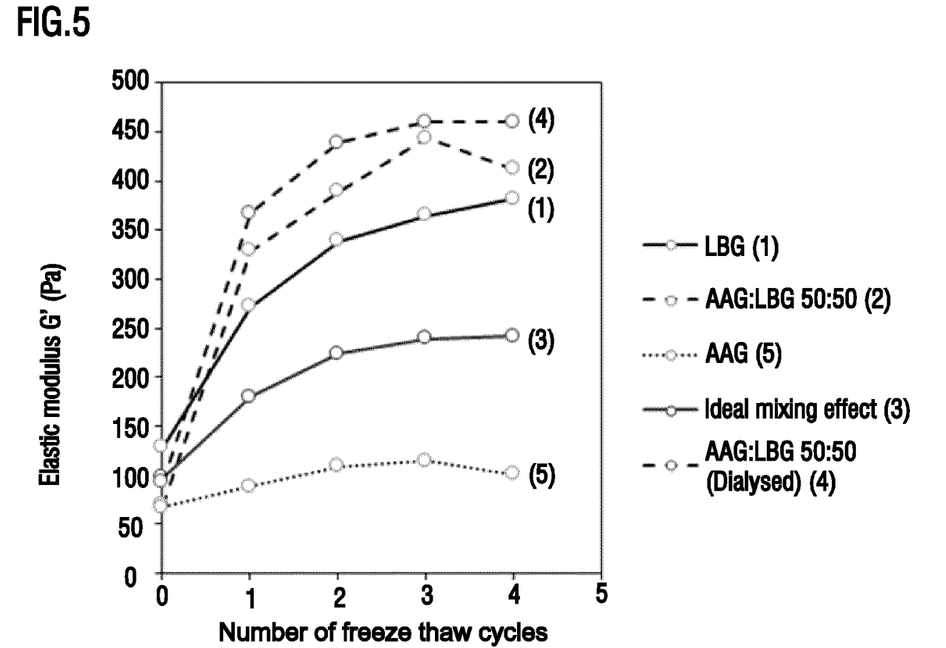
FIG. 5 exemplarily shows the cryo-gelation ability of the alfalfa galactomannan gum (which acronym is "AAG") according to various embodiments of the invention, and the cryo-gelation synergism between the alfalfa galactomannan gum and a commercial locust bean gum (which acronym is "LBG").
Figure 6:
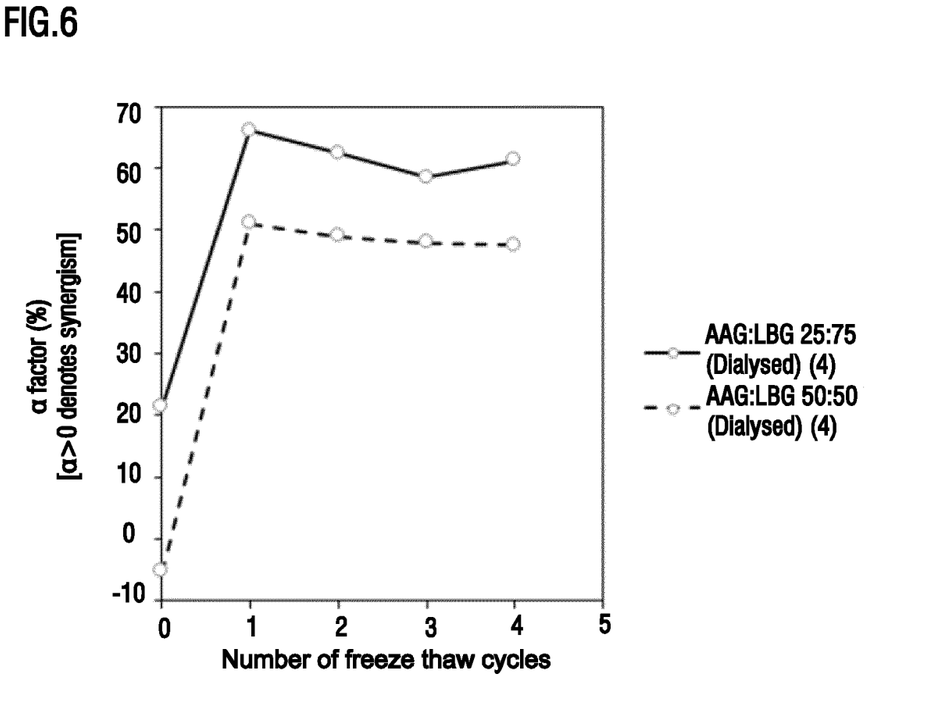
FIG. 6 exemplarily shows the cryo-gelation ability of the alfalfa galactomannan gum according to various embodiments of the invention in synergy with the commercial locust bean gum.

In FIGS. 5 and 6, the cryo-gelation of the alfalfa galactomannan gum alone, and in synergy with the locust bean gum, is shown. The acronym "AAG", in the figures, refers to the alfalfa galactomannan gum 37 obtained by the method according to the invention, and the acronym "LBG" refers to a commercially available locust bean gum.

The synergism between the galactomannan alfalfa gum 37 and the locust bean gum is visible even at low concentration of the alfalfa gum 37. With 25% of alfalfa gum 37, the synergism with the locust bean gum is enough for having a good cryo-gelation of the product (see also examples 3 to 6). This is more particularly shown in FIG. 6. The synergism is also relatively constant between 1 and 4 freeze cycles of the product.

Figure 7:
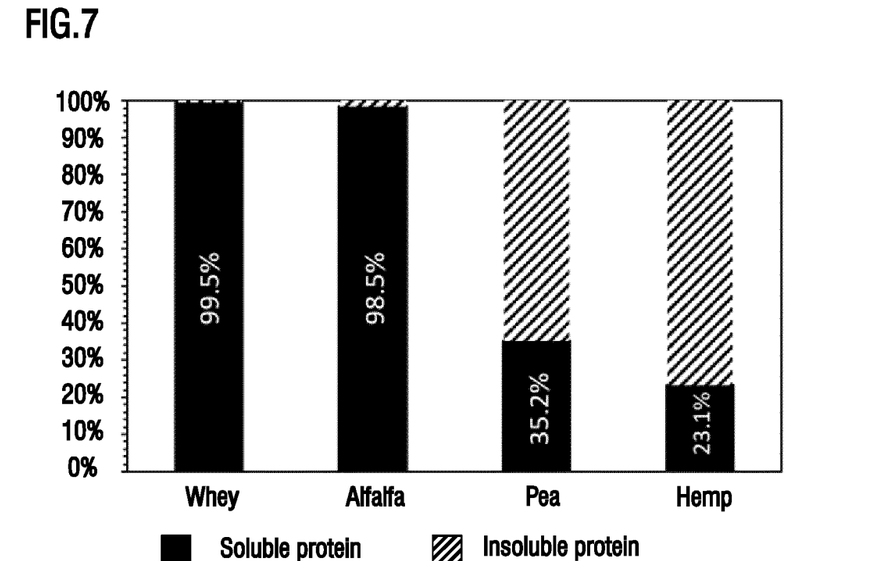
FIG. 7 exemplarily shows the fraction of soluble and insoluble matter in an alfalfa protein isolate obtained by the method according to various embodiments of the invention and in commercially available proteins supplements.

FIG. 7 discloses the percentage of soluble and insoluble proteins in whey, alfalfa, pea and hemp. Hemp is a fibre-producing plant, those fibres being used as a material for clothes. Pea is another Fabaceae plant, used mostly as food. Whey is one of the most used protein for sport nutrition supplements.

The percentage of soluble proteins in alfalfa, compared to the soluble proteins of pea and hemp, is three-time higher. In contrast, the concentration of soluble proteins in alfalfa is similar to the concentration of soluble proteins in whey. The high concentration in soluble proteins can be particularly useful when preparing protein extracts for use in food applications. Indeed, the insolubility of proteins at a pH used in food industries (pH around 7) limits their applications.

Figure 8:
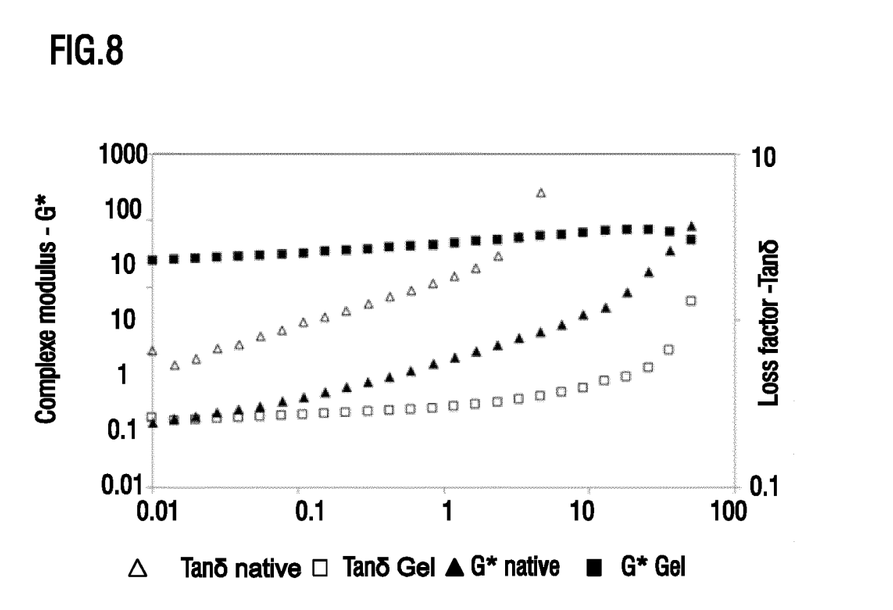
FIG. 8 exemplarily shows the complex modulus (G*) and loss factor (tan δ) of gels obtained from native (triangles) and heat treated (squares) alfalfa protein dispersions, obtained by the method according to various embodiments of the invention.
Figure 9:
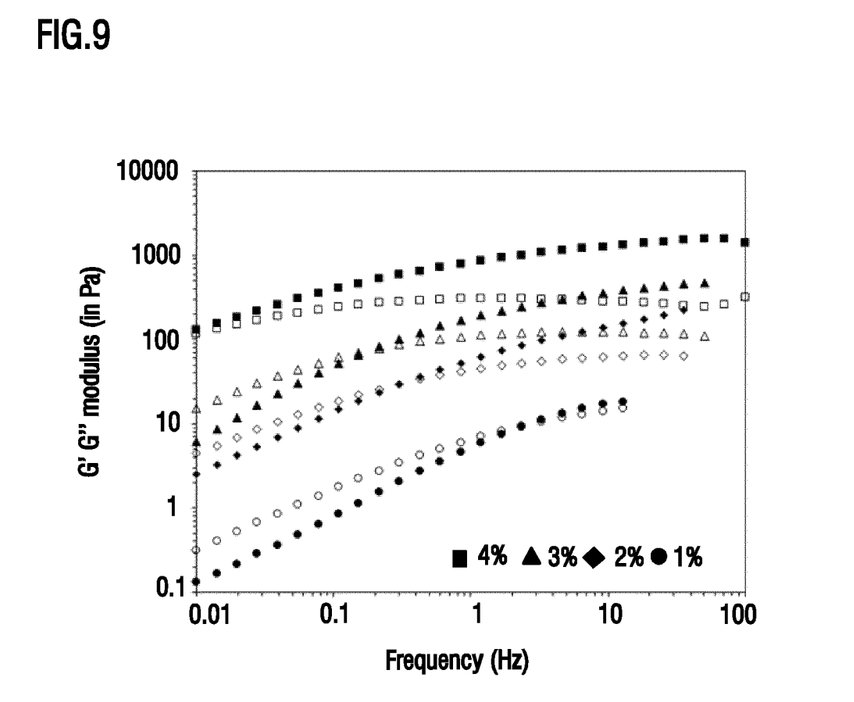
FIG. 9 exemplarily shows the dynamic rheological spectra of purified alfalfa gum aqueous solutions (1% to 4% w/w) at 25° C., obtained by the method according to various embodiments of the invention.

FIGS. 8 and 9 will be explained in the examples 12 and 13.

EXAMPLES

Example 1: Method of Extraction and Composition of a Purified Galactomannan Alfalfa Gum 37

Fifty grams of alfalfa seeds 7 were soaked in 500 mL of MilliQ water adjusted at pH=4 using 0.5% w/w citric acid at 50° C. for 2 h under mild magnetic stirring. The alfalfa seeds 7 suspension was washed two times with 2000 mL of MilliQ water, vacuum filtered using a Buchner funnel with fritted disc and the obtained seeds solids were freeze dried at −80° C. for 72 h. The lyophilized seeds were finely ground using a knife mill (8000 rpm for 5 min) and the obtained alfalfa meal was mixed with 500 mL of MilliQ water and kept at 50° C. under mechanical stirring for 2 h to allow sufficient extraction of the water-soluble biopolymers. Then, the alfalfa meal suspension was centrifuged at 18,000 g for 15 min and the supernatants obtained after two consecutive washings of the alfalfa solids with 500 mL of Milli-Q water are collected. The alfalfa pellet 21b (or protein-composed pellet, 21b) was characterised by a protein content of 48.1%±0.2%. The aqueous polysaccharides-composed supernatants 21a were pooled and mixed with 1.5 L of absolute ethanol to promote aggregation and precipitation of the polysaccharides. The ethanolic suspension was centrifuged at 4800 g for 10 min and the obtained polysaccharides gum pellet 25 was flashed with nitrogen to evaporate the ethanol excess, reconstituted in MilliQ water (adjusted with sodium carbonate at pH=10) and kept under stirring at 50° C. until complete dissolution of the gum solids. To remove the protein impurities, the pH of the biopolymer solution was adjusted at pH≈4.25 using citric acid and kept for 30 minutes. The resulting suspension was centrifuged at 18,000 g for 30 min and the supernatant was neutralized (pH=7) using sodium carbonate. For removing the residual sodium citrate, the polysaccharide solution was sequentially washed three times using a graded ethanolic solution in water at 50%, 70% and 90% (v/v) in ethanol. The suspension 31 was centrifuged and the pellet 33 was resolubilized in 100 ml of water and then dialyzed (cut-off 12 kDa) against MilliQ water for 72 h. Finally, the dialyzed polysaccharides aliquots were freeze dried at −80° C. for 5 days, and the obtained gum 37 lyophilized. The resulting protein content was found to be 1% using the method of Dumas using an Elemental analyser CHNS/O. Galactose and mannose of extracted gum 37 represented 99.5%±0.01% of the detectable sugar monomers. The galactomannan exhibited a mannose to galactose ratio of 1.18±0.14. The molecular weight was 1.99±0.19.106 Daltons. The full characterization of the gum 37 is displayed in Table 1.

TABLE 1

Compositional and structure conformational characteristics of the alfalfa gum 37

| | Alfalfa gum 37 |
|---|---|
| Proximate composition | |
| Total carbohydrates (%) | 87.3 ± 1.1 |
| Protein (%) | 1.1 ± 0.1 |
| Ash (%) | 2.7 ± 0.2 |
| Lipids (%) | traces |
| Moisture (%) | 8.9 ± 0.8 |
| Sugar monomers composition (g/100 g of total carbohydrate matter) | |
| Arabinose | 0.20 ± 0.0 |
| Galactose | 46.0 ± 2.8 |
| Glucose | 0.30 ± 0.0 |
| Mannose | 53.8 ± 3.0 |
| Fucose | nd |
| Rhamnose | nd |
| Uronic acids | nd |
| M/G | 1.18 ± 0.14 |
| $\overline{M_n}$ (×10$^5$ Da) | 10.21 ± 0.75 |
| $\overline{M_w}$ (×10$^5$ Da) | 19.96 ± 1.92 |
| $\overline{M_z}$ (×10$^5$ Da) | 28.49 ± 1.4 |
| $Đ_M$ | 2.11 ± 0.34 |
| $\overline{DP}$ | 5667 |
| [η] (dL · g$^{-1}$) | 9.40 |

Example 2: Method of Isolation and Composition of a Protein-Rich Alfalfa Protein Isolate 47

Alfalfa meal 21b (or protein-composed pellet, 21b), obtained after two washings from example 1, was used to extract proteins. All the insoluble matter collected was re-suspended in 500 mL of Milli-Q water. The suspension was then adjusted with sodium carbonate to pH 10 and kept under constant stirring for 2 h at 50° C. The suspension was then centrifuged at 18,000 g for 20 minutes at 20° C. The supernatant 43b was collected and centrifuged again at 18,000 g for 20 minutes at 20° C. in order to remove all the insoluble matter. The collected supernatant 43b was adjusted at pH 4.25 with citric acid and kept under stirring for 1 hour at room temperature. The protein suspension was then centrifuged at 18,000 g for 15 min at 20° C. The pellet 45 (or precipitate, 45) was recovered, re-dispersed in 100 ml of Milli-Q water and adjusted at pH 7 with sodium carbonate. The protein solution was then dialysed for 72 h against Milli-Q water in benzoylated cellulose dialysis tube with a cut-off of 3.5 kDa. The solution was then freeze-dried at −80° C. for 5 days. The obtained protein isolate 47 was determined using the method of Dumas with an elemental analyser. The resulting protein concentration obtained was 89.7%±2.3% w/w on dry basis and the yield of extraction was 16% w/w of the initial protein content.

Example 3: A Cryogel Made from a 2% w/w Aqueous Solution of Alfalfa Galactomannan Obtained According to the Method Given in Example 1

Two grams of alfalfa galactomannan gum 37 was dispersed into Milli-Q water and allowed to fully dissolve at 60° C. for 1 h. The obtained solution was cooled down at 4° C. and successively frozen in plate-plate rheometer geometry at −20° C. for 15 min. The frozen composition was thawed at 4° C. and the viscoelastic moduli were recorded. A four-fold freeze-thawing cycling of the gum composition was conducted and the development of the viscoelastic moduli was monitored (FIG. 5).

Example 4: A Synergistic Cryogel Made from an Aqueous Solution of a Blend of Alfalfa and Locust Bean Galactomannans One gram of alfalfa galactomannan gum 37 as extracted in Example 1 and one gram of locust bean gum were dispersed into 100 ml distilled water, hydrated at room temperature for 1 h and heated at 80° C. for 20 min. The obtained solution was rapidly cooled at 4° C. and subjected into a freeze-thaw cycling protocol as described in Example 3. The viscoelastic moduli development throughout the cycling process for the individual and binary galactomannan systems were recorded (FIG. 5, 6).

Example 5: An Alfalfa Galactomannan Gum 37 Stabilised Ice Cream Model

A model ice cream mix having the following composition (g/100 g): 12 g of skim milk protein; 24 g of sucrose, 0.15 g of locust bean gum, 0.15 g of alfalfa galactomannan gum 37 as extracted in example 1 and water balanced to 100 g, was made. Twenty-four grams of sucrose were dissolved into 60 g of water and left under stirring until full dissolution. Then, the dry ingredients (galactomannan gums and skim milk protein) were dispersed into the sugar solution at 50° C. under mechanical stirring, the mixture was batch pasteurised at 85° C. for 20 min and single stage homogenised (200 bar) at 70° C. The obtained ice cream mix exemplar was cooled at 4° C., aged at the same temperature overnight and subject into a freeze-thawing cycling as described in Example 3.

Example 6: A Protein Rich Galactomannan Extract

A galactomannan extract enriched with proteinaceous matter was produced by direct dehydration (e.g. freeze or spray drying) of the polysaccharides-composed supernatant 21a of the separation 111. The supernatant 21a comprises 25.6%±4.0% of protein residues and therefore, it can be used as an interfacial active stabilising agent (Table 2).

TABLE 2

Emulsifying performance of an alfalfa crude gum (corresponding to the supernatant 21a), of a highly purified galactomannan gum 37 and of an alfalfa protein isolate 47.

| Material | Mean lipid droplet size in freshly made emulsions (μm) | Mean lipid droplet size post centrifugation from creamed layer (μm) | Coalescence index (%) |
| --- | --- | --- | --- |
| Crude gum (21a) | 13.6 | 16.2 | 19.0 |
| Pure gum (37) | 52.8 | 100.4 | 90.2 |
| Protein isolate (47) | 16.3 | 27.9 | 71.4 |

Example 7: A Crude Alfalfa Galactomannan Extract

A galactomannan gum extract was produced as described in Example 1 omitting the steps 117, 119 and 131. Instead, the precipitated supernatant 23 was re-dispersed into distilled water and processed as described in steps 121 to 133. The resulting gum can be used as a standard purity alfalfa galactomannan (protein residual matter was 3.9±0.3%).

Example 8: An Alfalfa Protein Isolate 47 Based Foaming Agent

Two and a half grams of an alfalfa protein isolate 47, of a sodium caseinate or of a pea protein isolate were individually dispersed into 50 mL of distilled water at room temperature. The protein solutions were allowed to fully hydrate for 2 h under mild magnetic stirring and then rigorously aerated by means of high shear homogeniser (Turrax®-17,500 rpm) for 10 min. The obtained foams were kept at room temperature for 1 h and the volume of the retained foam was determined (Table 3).

TABLE 3

Volume of retained foam after a foam drainage test of whipped protein dispersions at room temperature

| Protein powders (5%) | Volume of remaining foam (cm$^3$) |
| --- | --- |
| Sodium caseinate | 15.9 ± 0.8 |
| Alfalfa protein isolate (47) | 15.2 ± 0.8 |
| Pea protein | 7.4 ± 0.7 |

Example 9: An Emulsion from Alfalfa Product as Listed in 1, 2 and 6

To test the interfacial activity of the products described in examples 1, 2 and 6, o/w emulsions.
(10% v/v) were produced. In particular, 0.5 g of a purified alfalfa galactomannan gum 37, of a crude alfalfa gum 31a or of an alfalfa protein isolate 47 were dispersed into 100 mL phosphate buffer saline (pH=7) and kept under mild stirring for 4 h to fully hydrate. 10 mL of rapeseed oil were dropwise added into 90 mL of the aforementioned biopolymer solutions under Turrax-assisted stirring at 7500 rpm. The obtained coarse emulsion was sheared at 21,000 rpm for 2 min using Turrax® in order to obtain a standard microemulsion. The lipid droplet size distribution of the freshly produced microemulsions was determined by means of static light scattering (Mastersizer® 3000, Malvern, UK). To test the stability of the microemulsions against gravitational lipid destabilisation (creaming) 10 mL of the freshly made emulsions were centrifuged at 1200 g for 10 min and the volume of the upper (lipid) phase was measured. The results are shown in the Table 2.

Example 10: Alfalfa Gum Products Produced Using Diverse Organic Solvent Precipitating Aids Four grams of polysaccharides-composed supernatant 21a described in example 6 were dispersed by means of Turrax® high shear blender (17,500 rpm) into 400 mL of alkali adjusted (NaOH 1M) MilliQ water (final pH=9) and left to hydrate for 2 h. Then, the pH of the biopolymer solution was adjusted at pH=4.25 using HCl 2M and the solution was kept under magnetic stirring for 30 min to allow sufficient protein aggregation. The obtained gum slurry was centrifuged at 12,000 g for 10 min and the supernatant was divided into four batches of 100 mL each. The gum comprising aliquots were mixed with equal volumes of the following organic solvent media: absolute ethanol, acetone, isopropanol (2-propanol) and an (1:1:1) organic solvent blend of ethanol, acetone and isopropanol. The aggregated gum was obtained by centrifuging the solvent containing aliquots at 5,000 g for 10 min. The gum pellets were dried overnight at 70° C. in an oven and the amount of the dried gum pellet was recorded. In addition, the protein residue content of the dried gum pellets was determined in order to understand the impact of the organic solvent in protein partitioning the solid (gum) phase. No significant differences were observed for the three solvents and the blend of them. The collected gum weight is reported in the Table 3.

TABLE 3

Total solids obtained by precipitation with acetone, ethanol isopropanol and a blend of the three.

| Organic solvent | Gum obtained (mg) |
|---|---|
| Acetone | 108.3 ± 3.1 |
| Ethanol | 105.9 ± 3.2 |
| Isopropanol | 106.9 ± 3.2 |
| Organic solvent blend (1:1:1 acetone:ethanol:isopropanol) | 105.3 ± 3.3 |

Example 11: A Protein Rich Composition Used as Sport Supplement

Four protein rich compositions for sports food applications i.e. alfalfa protein isolate (47; with 89.7% in protein, 2.2% moisture), whey protein isolate (93%, 7.4% moisture-commercial product), pea protein isolate (73% protein, 7.4% moisture-commercial sport food product) and hemp protein concentrate (54% protein content, 8.5% moisture-commercial sport food product) were tested. One scoop of each protein powder (equivalent to 2.5 g) was blended with 50 mL of deionised water in a plastic centrifuge tube. The tubes were mechanically shaken at 6 Hz for 2 minutes at room temperature to mimic the work for solubilising of protein sport formulations using a hand shaker. Then, the tubes were centrifuged for 15 min at 4700 g to precipitate the insoluble matter. The supernatant was discarded, and the tubes were allowed to dry for 24 h at 105° C. The solubility of the protein powders was expressed as follows:

Solubility index=(Total solids in the initial powder (d.b.)−Total solids in the precipitate (d.b.))/Total solids in the initial powder (d.b.)

Solubility of the protein sport formulations play a significant role in their acceptability to the consumers. The alfalfa protein-based composition was as soluble as whey protein isolate whilst it exerted 2.8 and 4.2 times higher solubility than pea and hemp protein isolates, respectively.

Example 12: Gelation of the Alfalfa Protein Isolate 47

A protein dispersion was made using the alfalfa protein isolate 47 produced through the procedure described in example 2. Ten grams of alfalfa protein isolate 47 were suspended in 100 ml of deionised water and allowed to fully hydrate under mechanical stirring for 1 h hour at room temperature. The alfalfa protein dispersion was divided into equal parts; one part kept untreated whereas the other part was heat treated in a water bath at 85° C. for 20 min. The viscoelastic properties (elastic and viscous modulus, complex modulus, loss factor) of the unheated and heat-treated protein dispersions were then recorded by means of oscillatory rheology (0.01 to 100 Hz, strain 0.5%) within the linear viscoelastic region using a plate-plate geometry (25 mm). As illustrated in FIG. 8, the heating of the alfalfa protein dispersion resulting in significant increase in the value of complex modulus (G*) followed by a concomitant decrease in the loss factor (tan δ), indicating the formation of heat induced protein gel at concentrations as low as 10% w/v. This example justifies the feasibility of alfalfa protein isolate 47 as natural structuring, gelling and binding agent in food products undergoing at least one heat processing step (e.g. pasteurisation, baking etc.)

Example 13: Alfalfa Gum Composition for Thickening and Gelling Applications

Aqueous alfalfa gum solutions (1, 2, 3 and 4% w/w) were prepared by dispersing alfalfa gum extract (obtained by the method described in example 1) into MilliQ water at room temperature. The gum dispersions were kept stirring for overnight to allow complete dissolution and hydration of the hydrocolloids. Sodium azide (0.02% w/w) was added as bacteriostatic agent. The viscoelastic behaviour of the gum dispersions was determined by means of oscillatory rheology i.e. frequency sweeps (0.01-100 Hz) at 0.5% strain at 25° C. using a cone-plate (50 mm,) 2° geometry. According to the obtained rheological spectra (FIG. 9), the alfalfa gum dispersions were characterised from a viscous (G'<G", at 1% w/w) to a predominantly gel-like (G'>>G", at 4% w/w). Mixed behaviours exerting a solid to viscous transition point can be obtained in the intermediate range of gum concentration (1<c<4% w/w), depending on the relaxation time (short relaxation time is mainly associated with solid-like behaviour).

Example 14: An Emulsion from Alfalfa Protein Isolate (47)

One gram of alfalfa protein isolate (47) was dissolved in 25 mL of Milli-Q water and left stirring to allow complete dissolution of the protein for 1 hour. The solution was then adjusted at pH 7 either using HCl or NaOH 0.1M. Soon after, 25 mL of canola oil was added to the aqueous protein solution. The emulsion was made using Ultra-Turax homogeniser at 10000 rpm for 1 minute. Finally, the emulsion was centrifuged for 5 minutes at 1300 g to determine the emulsifying activity as follow:

Emulsifying activity (%) =

(volume of emulsified phase/total volume) × 100

From the obtained samples, the emulsion stability was calculated after a second centrifugation and heating at 80° C. for 30 minutes as follow:

Emulsion stability (%)=(volume of emulsified phase/initial volume of the emulsified phase)

TABLE XX

Emulsion capacity and emulsion stability of Alfalfa seed protein isolate (47)

| | Emulsion capacity (% v/v) | Emulsion stability (%) |
|---|---|---|
| Alfalfa protein isolate (47) | 59.9 ± 0.2 | 96.1 ± 0.1 |

According to Prashant Sahni et al, Food Chemistry Volume 333, 15 Dec. 2020, 127503 ((https://doi.org/10.1016/ j.foodchem.2020.127503) emulsion capacity: 39.2% emulsion stability: 35.6% for non-processed alfalfa protein isolate; emulsion capacity: 60.8% emulsion stability: 50.9% for processed alfalfa protein isolate.

The invention claimed is:

1. A method of extracting polysaccharides from alfalfa plants, said method comprising the followings steps:
    milling of the alfalfa plants;
    extracting polysaccharides by addition of a buffer solution to the milled alfalfa plants;
    separating the milled alfalfa plants of the buffer solution, thus producing a polysaccharides-composed supernatant and a protein-composed pellet; and
    precipitating the polysaccharides in the polysaccharides-composed supernatant so as to produce a polysaccharide gum pellet;
    wherein the alfalfa plants comprise alfalfa seeds; and
    wherein the method further comprises the following steps, prior to the milling step:
    soaking of the alfalfa plants in water so as to swell the alfalfa seeds;
    mesh filtrating the alfalfa plants comprising the swollen alfalfa seeds; and
    drying of the alfalfa plants comprising the swollen alfalfa seeds, so as to concentrate galactomannan in the polysaccharide gum pellet.

2. The method according to claim 1, wherein the step of precipitation of the polysaccharides is made with at least one organic solvent.

3. The method according to claim 1, wherein, after the step of precipitation of the polysaccharides, several sequential-graded precipitations of the polysaccharides, with at least one organic solvent, are carried out, so as to produce the polysaccharide gum pellet that is refined.

4. The method according to claim 3, wherein the several sequential-graded precipitations of the polysaccharides with at least one organic solvent are respectively carried out with sequential concentrations of the at least one organic solvent from 50% to 90% in volume in an aqueous solution.

5. The method according to claim 1, wherein the alfalfa seeds correspond to at least 90% in weight of the alfalfa plants.

6. The method according to claim 1, wherein the step of extraction further comprises adjusting of the pH of the buffer solution to a pH comprised between 3 and 6.

7. The method according to claim 1, wherein the soaking of the alfalfa plants in water is carried out at alfalfa plants/water ratios ranging from 1:5 to 1:40, at a temperature comprised between 20° C. and 90° C. for a duration comprised between 20 minutes and 10 hours.

8. The method according to claim 1, wherein the method further comprises the following steps, after the step of precipitation of the polysaccharides-composed supernatant:
    centrifugating the precipitated polysaccharides so as to produce the polysaccharide gum pellet; and
    reconstituting the polysaccharides gum pellet in water, forming a dispersed polysaccharide gum pellet, and adjusting the dispersed polysaccharide gum pellet to a pH above 9.

9. The method according to claim 8, wherein the method further comprises the following steps, after adjusting the pH of the dispersed polysaccharides gum pellet:
    acidification of the dispersed polysaccharide gum pellet to a pH comprised between 3 and 6, then
    centrifugating the dispersed polysaccharide gum pellet.

10. The method according to claim 1, wherein the method further comprises the following steps, after the step of precipitation of the polysaccharides is carried out:
    reconstituting in water of the polysaccharide gum pellet;
    reconstituting a dispersed polysaccharide gum pellet in an acidified water;
    neutralizating the dispersed polysaccharide gum pellet with an alkali solute;
    dialysis, ultrafiltration or reverse osmosis of the dispersed polysaccharide gum pellet; and
    drying of the dispersed polysaccharide gum pellet.

11. The method according to claim 1, wherein the protein-composed pellet, obtained after the step of separation of the milled plants, forms an alfalfa seed meal protein concentrate; the alfalfa seed meal protein concentrate being further processed by the following steps:
    suspending the alfalfa seed meal protein concentrate into alkaline water, forming a suspension with a pH above 8; and
    solid-liquid separating the suspension, producing a sediment and a supernatant solution, the sediment forming an alfalfa seed protein flour.

12. The method according to claim 11, wherein the supernatant solution produced by the solid-liquid separation of the suspension is further processed by the following steps:
    precipitating the supernatant solution at a pH comprised between 3 and 6;
    centrifugating the supernatant solution, producing at least a precipitate, submitting the precipitate to a dialysis, an ultrafiltration or a reverse osmosis; and
    drying of the precipitate, thus forming an alfalfa protein isolate.

13. The method according to claim 1, wherein adjusting the pH above 8 or 9 is carried out with an alkali solute.

14. The method according to claim 12, wherein adjusting the pH between 3 and 6 is carried out with an acid.

15. The method according to claim 1, wherein a concentration in weight of galactose and mannose in the polysaccharides gum pellets is at least 80%.

* * * * *